United States Patent
Lacroix

(10) Patent No.: US 9,621,715 B2
(45) Date of Patent: Apr. 11, 2017

(54) DELIVERING A TOLL-FREE CALLER ID ON TOLL-FREE CALLS

(71) Applicant: Verizon Patent and Licensing Inc., Arlington, VA (US)

(72) Inventor: Jeffrey Lacroix, Irving, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 101 days.

(21) Appl. No.: 14/635,684

(22) Filed: Mar. 2, 2015

(65) Prior Publication Data

US 2016/0261740 A1    Sep. 8, 2016

(51) Int. Cl.
  *H04M 3/42*   (2006.01)
  *H04M 7/00*   (2006.01)
  *H04M 15/08*  (2006.01)
  *H04M 15/06*  (2006.01)
  *H04M 15/00*  (2006.01)

(52) U.S. Cl.
  CPC ..... *H04M 3/42042* (2013.01); *H04M 7/0081* (2013.01); *H04M 15/06* (2013.01); *H04M 15/08* (2013.01); *H04M 15/63* (2013.01)

(58) Field of Classification Search
  None
  See application file for complete search history.

(56) References Cited

U.S. PATENT DOCUMENTS

| | | | | |
|---|---|---|---|---|
| 7,180,984 B1* | 2/2007 | Samarasinghe | ... | H04L 29/06027 370/354 |
| 7,242,759 B1* | 7/2007 | Sanchez | ............ | H04M 3/42306 379/219 |
| 2008/0253362 A1* | 10/2008 | Samarasinghe | ....... | H04M 7/123 370/352 |
| 2013/0010652 A1* | 1/2013 | Samarasinghe | ....... | H04M 7/123 370/259 |
| 2013/0177142 A1* | 7/2013 | Allen | ................... | H04Q 3/0045 379/88.03 |

* cited by examiner

Primary Examiner — Eunsook Choi

(57) ABSTRACT

A computer device may include logic configured to receive a Session Initiation Protocol (SIP) telephone call and identify the SIP telephone call as originating from a first toll-free telephone number and destined for a second toll-free telephone number. The computer device may further determine a screened telephone number associated with the first toll-free telephone number; generate a diversion header that includes the determined screened telephone number for the SIP telephone call, in response to identifying the SIP telephone call as originating from the first toll-free telephone number and destined for the second toll-free telephone number; and send the SIP telephone call to a local exchange carrier network associated with the second toll-free telephone number.

18 Claims, 7 Drawing Sheets

```
INVITE sip:8555555550162.7.14.140:5060 SIP/2.0
Via: SIP/2.0/UDP 162.7.26.13:5060;branch=z9hG4bK27ce15734e99
From: "Big Call Center" <sip:8666666660162.7.26.13>;tag=18019~fe171de1-7ea6-4a70-adc1-
5c722bb7010f-92805112
To: <sip:8555555550162.7.14.140>
Date: Tue, 10 Dec 2013 05:47:18 GMT
Call-ID: 86517c80-2a61aae6-27bb-d1a07a20162.7.26.13
Supported: timer,resource-priority,replaces
Min-SE: 1800
Allow: INVITE, OPTIONS, INFO, BYE, CANCEL, ACK, PRACK, UPDATE, REFER, SUBSCRIBE, NOTIFY
CSeq: 101 INVITE
Expires: 180
Allow-Events: presence
P-Asserted-Identity: "8666666666" <sip:97233333330162.7.26.13>
Session-Expires: 1800
Diversion: <sip:97222222220162.7.13.13>
Max-Forwards: 69
Content-Type: application/sdp
Content-Length: 406
```

FIG. 6

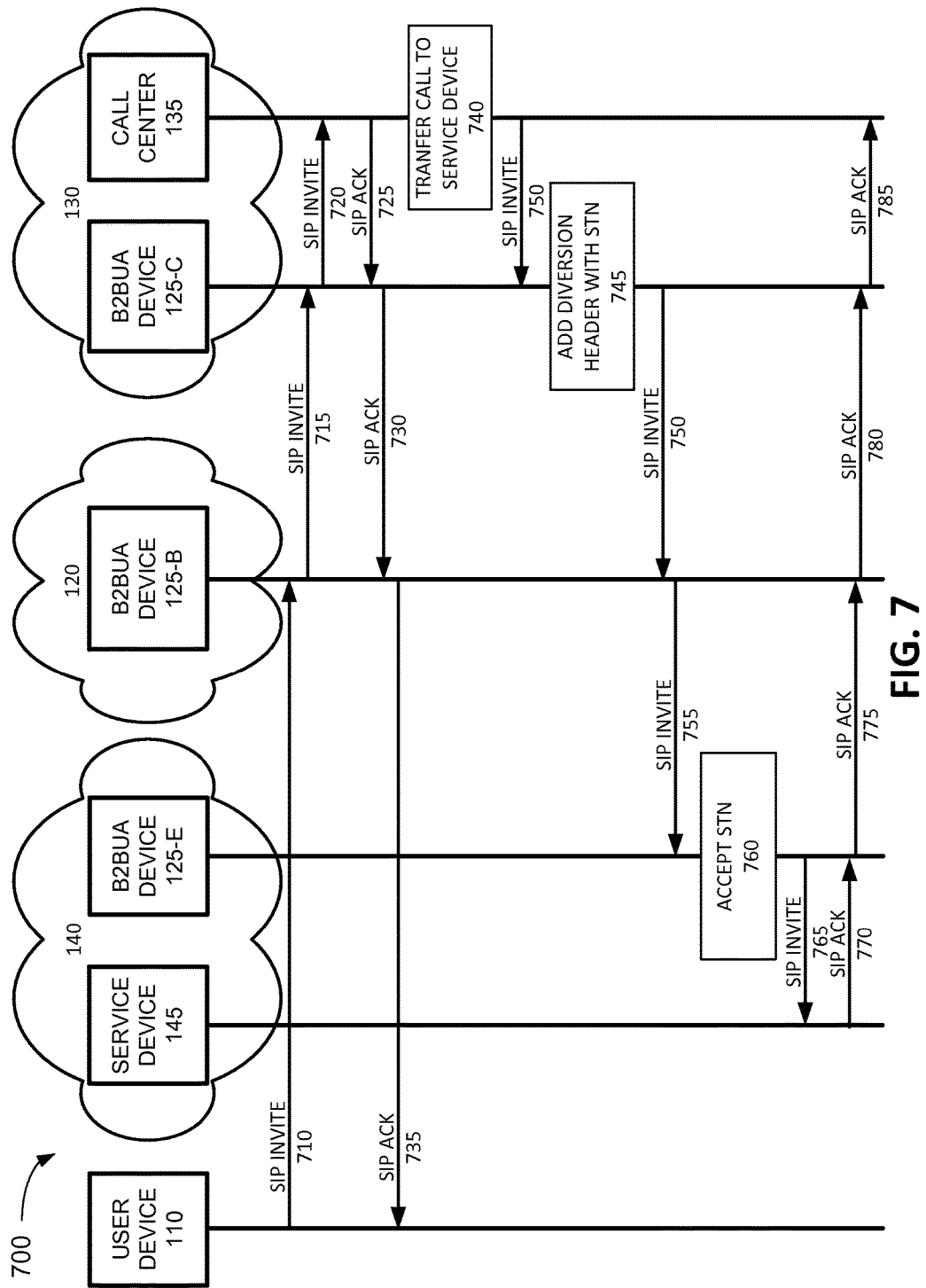

DELIVERING A TOLL-FREE CALLER ID ON TOLL-FREE CALLS

BACKGROUND INFORMATION

A toll-free telephone number is a telephone number that is billed for incoming calls rather than charging a caller of the toll-free telephone number for placing the call. Thus, a caller may call the toll-free telephone number without being charged for the call. Toll-free numbers may begin with a prefix well known to customers, such as "800," "866", or "877" and may be provided by businesses or other types of large organizations to encourage customers to call without incurring charges for the call. Furthermore, a toll-free "vanity" number may include an easy to recognize pattern or number which may be valuable to the business or organization for branding or as a direct response tool.

Voice communication is increasingly being implemented in a packed-switched Internet Protocol (IP) network through the use of Voice over IP (VoIP) technologies. VoIP may be implemented using Session Initiation Protocol (SIP). SIP networks may experience problems handling certain types of toll-free telephone calls.

BRIEF DESCRIPTION OF THE DRAWINGS

FIG. 6 is a diagram of an exemplary Session Initiation Protocol message according to an exemplary implementation described herein;

FIG. 7 is a first exemplary signal flow for delivering a toll-free caller identifier according to an implementation described herein.

DETAILED DESCRIPTION OF PREFERRED EMBODIMENTS

Figure 1:
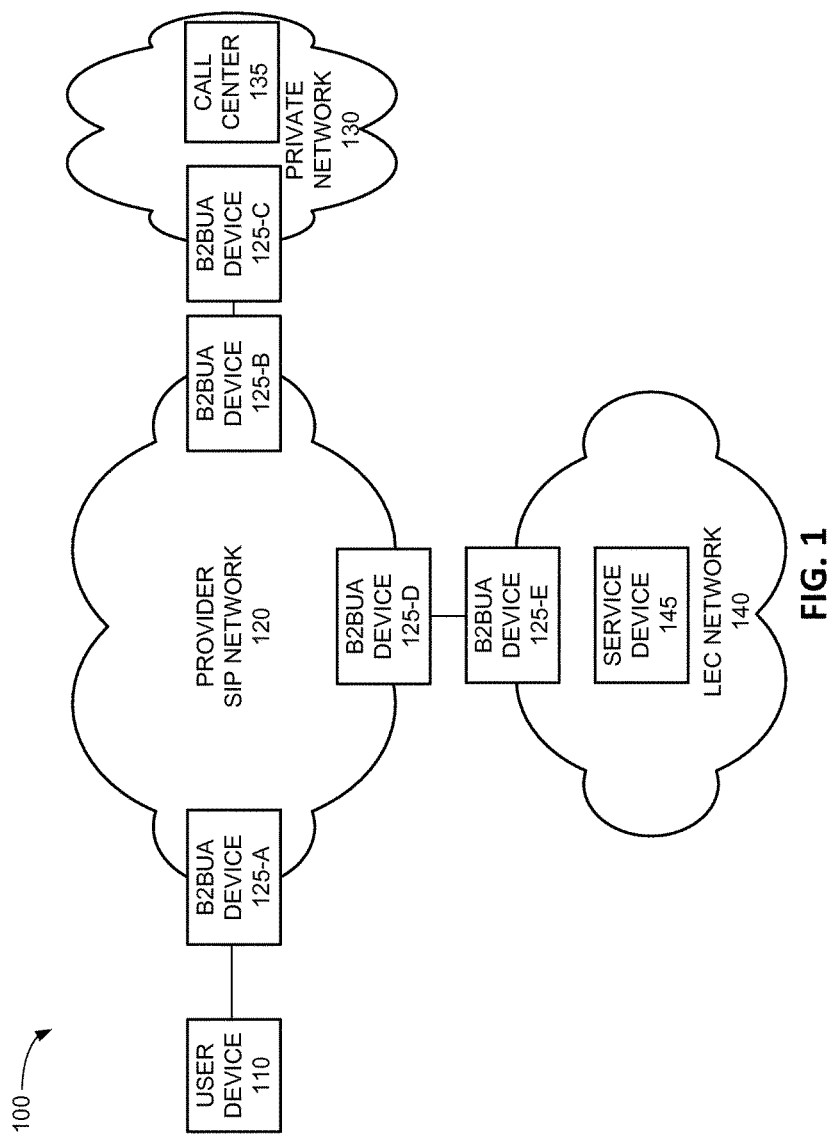
FIG. 1 is a diagram illustrating an exemplary environment according to an implementation described herein.

The following detailed description refers to the accompanying drawings. The same reference numbers in different drawings identify the same or similar elements.

When a toll-free telephone number receives an incoming telephone call, a device associated with the toll-free telephone number may capture the telephone number of the caller for billing or identification purposes. The calling telephone number may be obtained through automatic number identification (ANI), which may function independent of caller identification (ID) and may therefore function even if the caller has blocked caller ID. Because of the ANI requirement for toll-free telephone numbers, a call to a toll-free telephone number may be rejected if the calling number cannot be identified.

A call routing device in a local exchange carrier (LEC) telephone network may be configured to perform processing for calls incoming to a toll-free telephone number in the LEC telephone network and to reject calls that do not include a valid originating telephone number. One example of a calling number that may not be accepted may be a toll-free number, such as an "800" number, because such numbers may not be considered the true identity of the caller. Thus, a telephone call from a first toll-free number to a second toll-free number may be rejected by a call routing device in a LEC telephone network.

Telephone calls from a first toll-free number to a second toll-free number are becoming more common. For example, a first call center reachable via a first toll-free number may outsource a service to a second call center, service center, or customer agent reachable via a second toll-free number in a LEC telephone network. Thus, for example, when a customer agent or an interactive voice response (IVR) system in the first call center selects to transfer a customer call to the second call center, service center, or customer agent, the first call center may send a Session Initiation Protocol (SIP) INVITE message to the LEC telephone network via a provider network using SIP trunking. The SIP INVITE message may include a FROM header that includes the first toll-free number associated with the first call center and a TO header that includes the second toll-free number associated with the second call center, service center, or customer agent. A routing device in the LEC telephone network may reject the telephone call because the routing device may determine that the FROM header does not include a valid Direct Inward Dialing (DID) telephone number identifying the calling party.

Implementations described herein relate to delivering a toll-free caller ID on toll-free telephone calls. A back-to-back user agent (B2BUA) device, such as an Internet Protocol (IP) Private Branch Exchange (PBX) device, a Session Border Controller device, or a SIP Application Server device may be configured to receive an outgoing SIP telephone call and to identify the outgoing SIP telephone call as originating from a first toll-free telephone number and destined for a second toll-free telephone number. For example, the B2BUA device may receive a SIP INVITE message with a FROM header that includes the first toll-free telephone number and a TO header that includes the second toll-free telephone number. The SIP outgoing call may be initiated, for example, by a call center that has elected to transfer a call from a customer to another call center or service center located in another network.

In response, the B2BUA device may determine a screened telephone number associated with the first toll-free telephone number. The screened telephone number may be assigned to the first toll-free telephone number by a provider network that carries SIP telephone calls (e.g., provides SIP trunking) between a SIP network associated with the first toll-free telephone number and other networks. The B2BUA device may generate a diversion header that includes the determined screened telephone number for the outgoing SIP telephone call, and may send the outgoing SIP telephone call to a LEC network associated with the second toll-free telephone number.

Some LEC networks may accept a toll-free to toll-free SIP call with a diversion header that includes the screened telephone number, since the screened telephone number may be recognized as a valid telephone number that identifies the calling party. However, other LEC networks may reject the call and the B2BUA may receive an indication from the LEC network that the outgoing SIP telephone call was rejected. In response, the B2BUA device may generate an asserted identity header (e.g. a private asserted identity (P-AI) header) that includes an access number associated with the first toll-free telephone number and may re-send the outgoing SIP telephone call to the LEC network with the generated asserted identity header. The access number may correspond, for example, to a non-toll-free telephone number that a customer may use to reach the call center. The access number may be displayed to the customer as the number being called. Furthermore, the B2BUA device may include the first toll-free telephone number as a display number in the asserted identity number. Some LEC networks may be configured to display the display number to the customer as the number being called and thus the customer may still see the first toll-free number as the number being called after the telephone call is transferred to the second toll-free number.

In some implementations, the B2BUA device may be located in the SIP network from which the outgoing SIP telephone call originated, such as the SIP network that includes the call center called by the customer. In other implementations, the B2BUA device may be located in a provider network that transfers the call from the SIP network of the call center to the LEC network of the outsourced service to which the call is being transferred.

In some implementations, the B2BUA device may maintain a database of LEC networks to which toll-free telephone calls have been transferred. Thus, the B2BUA device may store indications of which LEC networks require an asserted identity header and which LEC networks will accept toll-free telephone calls with only a diversion header. Based on information stored in the LEC database, the B2BUA device may automatically add the asserted identity header to an outgoing toll-free call to a particular LEC network, without waiting for an indication that a call has been rejected.

FIG. 1 is a diagram of an exemplary environment 100 in which the systems and/or methods described herein may be implemented. As shown in FIG. 1, environment 100 may include user device 110, a provider SIP network 120, a private network 130, and a LEC network 140.

User device 110 may include any device configured for placing and/or receiving telephone calls. For example, user device 110 may include a telephone terminal; a personal computer or workstation; a server device; a laptop, tablet, or another type of portable computer; a set-top box; a gaming system; a portable communication device (e.g., a mobile phone, a smart phone, a global positioning system (GPS) device, a wearable computer device, and/or another type of wireless device); and/or any type of device with communication capability configured for placing and/or receiving telephone calls.

Provider SIP network 120 may include a SIP network managed by a provider of communication services. Provider SIP network 120 interfaces with private network 130, user device 110, and/or with LEC network 140 and enables private network 130, user device 110, and/or with LEC to communicate with each other. Provider SIP network 120 may be implemented, for example, in a multi-protocol label switching (MPLS) network implemented in one or more circuit-switched networks and/or packet-switched networks that include a local area network (LAN), a wide area network (WAN), a metropolitan area network (MAN), an ad hoc network, an intranet, the Internet, a fiber optic-based network, a wireless network, and/or any combination of these or other types of networks.

Private network 130 may include a SIP network associated with an enterprise, such as a company or an organization. For example, private network 130 may connect multiple branch locations or offices of the enterprise (e.g., a first office in a first city, a second office in a second city, etc.) and may enable SIP devices in private network 130 to communicate with each other and to communicate with devices in other networks via provider network 120. Private network 130 may be implemented, for example, in an MPLS network implemented in one or more circuit-switched networks and/or packet-switched networks that include a LAN, a WAN, a MAN, an ad hoc network, an intranet, the Internet, a fiber optic-based network, a wireless network, and/or any combination of these or other types of networks. Private network 130 may include call center 135.

Call center 135 may include one or more computer devices, such as server devices, configured to perform call center services for customers associated with the enterprise of private network 130. For example, customers may place telephone call and/or send text-based messages to call center 135 to request help with products or services associated with the enterprise, such as to place an order, seek help with an existing problem, report a new problem, etc. Call center 135 may be configured to communicate with customer agents to handle calls or other types of communications from a customer. Furthermore, call center 135 may include an interactive voice response (IVR) system. The IVR system may run an IVR platform that directs a customer through an automated menu system and may help the customer with an automated response or may direct the customer to a customer agent. The IVR system, or a customer agent, may select to transfer the customer's call to a service device in an outside network, such as to LEC network 140.

LEC network 140 may include a SIP network or a local time division multiplexing (TDM) network associated with the public circuit-switched telephone network (PSTN) operated by a regional telephone company. LEC network 140 may include service device 145. Service device 145 may include another call center, similar to call center 135 and may include a telephone device associated with a customer agent, and/or may include another type of service device that performs a service for a customer calling call center 135 via user device 110. For example, service device 145 may include an IVR system dedicated to a particular topic or department not handled by call center 135, may include customer agents to handle overflow calls when call center 135 reaches capacity, and/or may provide a different type of service.

Provider SIP network 120, private network 130, and/or LEC network 140 may include B2BUA devices 125 (referred to herein collectively as "B2BUA devices 125" and individually as "B2BUA device 125"). For example, provider SIP network 120 may include B2BUA devices 125-A, 125-B, and 125-D; private network 130 may include B2BUA device 125-C; and LEC network 140 may include B2BUA device 125-E.

While FIG. 1 shows a particular number of B2BUA devices 125 in provider SIP network 120, private network 130, and LEC network 140, in practice, provider SIP network 120, private network 130, and/or LEC network 140 may include a different number of B2BUA devices 125. In particular, provider SIP network 120 may include a large number of B2BUA devices 125. Furthermore, while FIG. 1 shows a single private network 130 and a single LEC network 140 for illustrative purposes, in practice, provider SIP network 120 may be connected to multiple (e.g., a large number of), private networks 130 and/or LEC networks 140.

B2BUA device 125 may include any device configured as a SIP B2BUA device. A SIP B2BUA device may divide a SIP communication channel into two call segments, an incoming call segment and an outgoing call segment. A SIP B2BUA may include an answering user agent (UA) that receives SIP messages from another UA, an originating UA that generates SIP messages based on SIP messages received by the answering UA, and call control logic that processes SIP messages received by the answering UA. For example, the call control logic may perform authentication and authorization, may add a diversion header to a SIP message, may add an asserted identity header to a SIP message, may process a SIP message based on a particular call scenario script, and/or may perform other processing in a SIP message.

A B2BUA may be implemented, for example, by an Internet Protocol (IP) Private Branch Exchange (PBX). An IP-PBX may function as a telephone exchange for VoIP telephones in a particular business or office location and may process connections among internal VoIP telephones of a private organization associated with the business or office location.

As another example, a B2BUA may be implemented by a Session Border Controller (SBC). An SBC may control setting up, conducting, and terminating of SIP media streams, such as audio or video calls. An SBC may function as an interface device between a branch office and a SIP trunk in a SIP network and may perform security functions for the branch office, such as concealing the connectivity of the branch office from the SIP network, encryption, authentication and/or authorization, and/or other security functions; may perform connectivity functions, such as Network Address Translation (NAT), SIP header manipulation, and/or other connectivity functions; may perform Quality of Service (QoS) functions, such as traffic policing, resource allocation, rate limiting, and/or other QoS functions; and/or may perform other types of functions.

As yet another example, a B2BUA may be implemented by a SIP Application Server (AS). A SIP-AS may perform functions analogous to an SBC and may include additional functionality, such as audio announcement playback, voicemail service, call recording, speech recognition, dual-tone multi-frequency (DTMF) signaling processing, and/or other types of functions.

B2BUA device 125 may function as an exchange for SIP phone devices in a particular network and may provide access to private SIP network 120 for SIP phone devices in the particular network. Thus, B2BUA 115 may act as a user agent server for SIP calls originating from SIP phone devices in the particular network and may process the SIP calls as a user agent client with respect to private SIP network 120. Furthermore, B2BUA 115 may act as a user agent server for SIP calls received via private SIP network 120 and may process the SIP calls as a user agent client with respect to SIP phone devices in the particular network.

In particular, B2BUA device 125-A may interface user device 110 with provider SIP network 120. User device 110 may connect to B2BUA device 125-A via another network (not shown in FIG. 1). B2BUA device 125-A may act as a user agent server with respect to calls received from user device 110 and may process the SIP calls as a user agent client with respect to provider SIP network 120. B2BUA device 125-A may act a user agent server with respect to calls received via provider SIP network 120 and may process the SIP calls as a user agent client with respect to user device 110.

B2BUA device 125-B in provider SIP network 120 may communicate with B2BUA device 125-C in private network 130. B2BUA device 125-C may interface call center 135 with provider SIP network 120. B2BUA device 125-C may act as a user agent server with respect to calls received from call center 135 and may process the SIP calls as a user agent client with respect to provider SIP network 120. B2BUA device 125-C may act a user agent server with respect to calls received via provider SIP network 120 and may process the SIP calls as a user agent client with respect to call center 135.

B2BUA device 125-D in provider SIP network 120 may communicate with B2BUA device 125-E in LEC network 140. B2BUA device 125-D may interface service device 145 with provider SIP network 120. B2BUA device 125-D may act as a user agent server with respect to calls received from service device 145 and may process the SIP calls as a user agent client with respect to provider SIP network 120. B2BUA device 125-D may act as a user agent server with respect to calls received via provider SIP network 120 and may process the SIP calls as a user agent client with respect to service device 145.

Signals from one B2BUA device 125 to another B2BUA device 125, or signals between a B2BUA device 125 and a SIP telephone device, may be routed via one or more network devices, such as routers, SIP gateways, SIP proxies, and/or other types of devices (not shown in FIG. 1). As an example, a SIP gateway may terminate a SIP call signal from B2BUA device 125-E, may generate time division multiplexing (TDM) signals, such as Signaling System No. 7 (SS7) signals, based on the SIP call signal, and may provide the TDM signals to a call routing device that routes the calls to devices in LEC network 140, such as service device 145.

Although FIG. 1 shows exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

Figure 2:
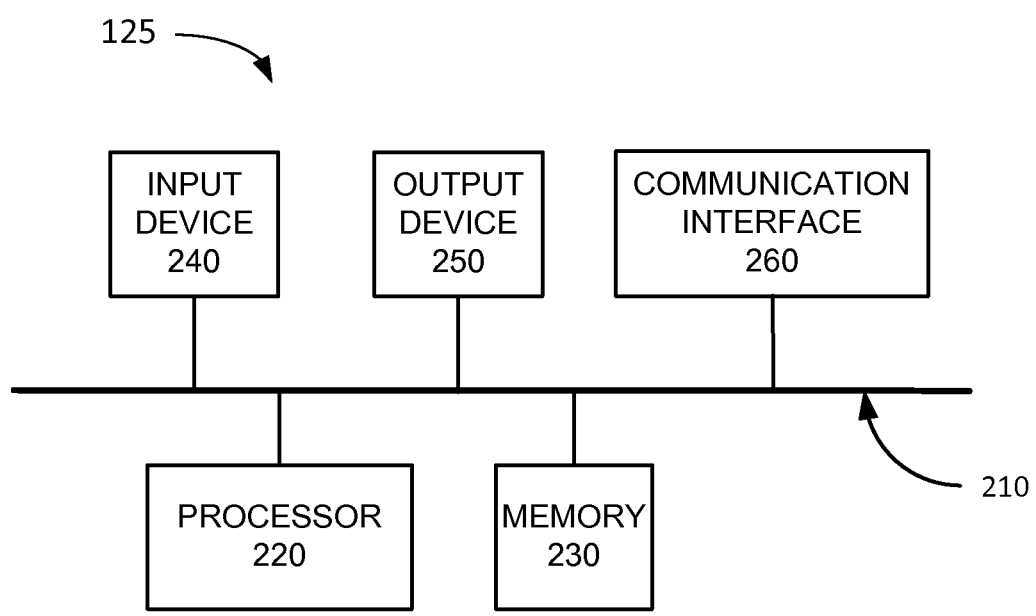
FIG. 2 is a diagram illustrating exemplary components of a device that may be included in one or more components of FIG. 1.

FIG. 2 is a diagram illustrating exemplary components of B2BUA device 125 (e.g., any of B2BUA devices 125-A to 125-E of FIG. 1) according to an implementation described herein. As shown in FIG. 2, B2BUA device 125 may include a bus 210, a processor 220, a memory 230, an input device 240, an output device 250, and a communication interface 260.

Bus 210 may include a path that permits communication among the components of B2BUA device 125. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into B2BUA device 125. Input device 240 may include, for example, a keyboard, a mouse, a pen, a microphone, a remote control, an audio capture device, an image and/or video capture device, a touch-screen display, and/or another type of input device. In some embodiments, B2BUA device 125 may be managed remotely and may not include input device 240. In other words, B2BUA device 125 may be "headless" and may not include a keyboard, for example.

Output device 250 may output information to an operator of B2BUA device 125. Output device 250 may include a display, a printer, a speaker, and/or another type of output device. For example, B2BUA device 125 may include a display, which may include a liquid-crystal display (LCD) for displaying content to the customer. In some embodiments, B2BUA device 125 may be managed remotely and may not include output device 250. In other words, B2BUA device 125 may be "headless" and may not include a display, for example.

Communication interface 260 may include a transceiver that enables B2BUA device 125 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, B2BUA device 125 may perform certain operations relating to processing of SIP calls. B2BUA device 125 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of B2BUA device 125, in other implementations, B2BUA device 125 may include fewer components, different components, additional components, or differently arranged components than depicted in FIG. 2. Additionally or alternatively, one or more components of B2BUA device 125 may perform one or more tasks described as being performed by one or more other components of B2BUA device 125.

Figure 3:
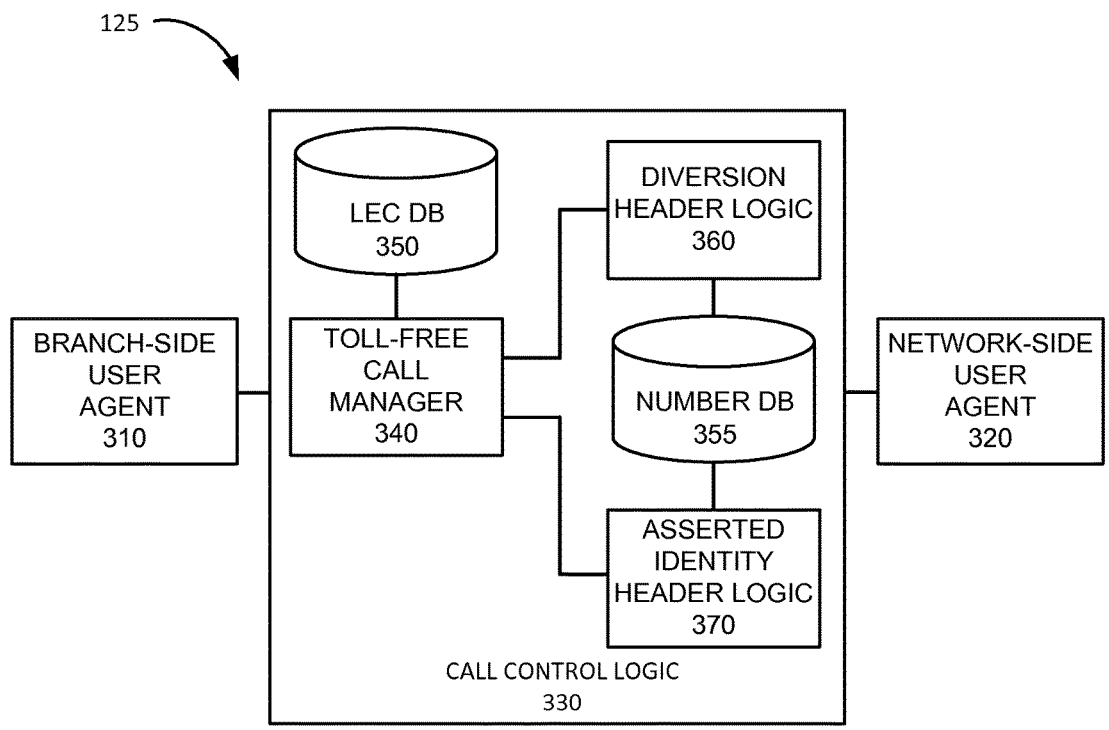
FIG. 3 is a diagram illustrating exemplary functional components of a back-to-back user agent device of FIG. 1.

FIG. 3 is a diagram of exemplary functional components of B2BUA device 125. The functional components of B2BUA device 125 may be implemented, for example, via processor 220 executing instructions from memory 230. Additionally or alternatively, some or all of the functional components of B2BUA device 125 may be hard-wired. As shown in FIG. 3, B2BUA device 125 may include a branch-side UA 310, a call control logic 320, and a network-side UA 330.

Branch-side UA 310 may function as a user agent server with respect to SIP calls received from SIP phone devices within the network associated with B2BUA 125 and may act as a user agent client with respect to outgoing SIP calls to SIP phone devices in another network. Network-side UA 320 may function as a user agent server with respect to SIP calls received via another network and may act as a user agent client with respect to calls outgoing to SIP phone devices within the network associated with B2BUA 125.

Call control logic 330 may process SIP calls received by branch-side UA 310 or network-side UA 320. Call control logic 330 may include a toll-free call manager 340, a LEC database (DB) 350, a number DB 355, a diversion header logic 360, and an asserted identity header logic 370.

Toll-free call manager 340 may manage toll-free calls. For example, toll-free call manager 340 may detect calls received via branch-side UA 310 that originate from a first toll-free number and that are destined to a second toll-free number. Toll-free call manager 340 may forward calls identified as being from a first toll-free number to a second toll-free number to diversion header logic 360. Furthermore, toll-free call manager 340 may receive an indication, via network-side UA 320, that a call from a first toll-free number to a second toll-free number with a diversion header was rejected by LEC network 140 and may, in response, forward the call to asserted identity header logic 370.

Furthermore, in some implementations, toll-free call manager 340 may access LEC DB 350 when processing a toll-free call. LEC DB 350 may store information relating to particular LEC networks 140. For example, when toll-free call manager 340 receives an indication from a particular LEC network 140 that a call from a first toll-free number to a second toll-free number was rejected by the particular LEC network 140 when only a diversion header was included, toll-free call manager 340 may store an indication in LEC DB 350 that the particular LEC network 140 requires an asserted identity header.

Number DB 355 may store information relating to particular toll-free numbers. Exemplary information that may be stored in number DB 355 is described below with reference to FIG. 4. Diversion header logic 360 may generate a diversion header for a SIP call. For example, toll-free call manager 340 may instruct diversion header logic 360 to add a diversion header to an outgoing SIP call from a first toll-free number to a second toll-free number. Diversion header logic 360 may access numbers DB 355 to identify a screened telephone number associated with the first toll-free number and may add the identified screened telephone number to the generated diversion header.

Asserted identity header logic 370 may generate an asserted identify header for a SIP call, such as a P-AI header. For example, toll-free call manager 340 may instruct asserted identity header logic 370 to add an asserted identity header to an outgoing SIP call from a first toll-free number to a second toll-free number. Asserted identity header logic 370 may access numbers DB 355 to identify an access number associated with the first toll-free number and may add the identified access number to the generated asserted identity header.

Although FIG. 3 shows exemplary functional components of B2BUA device 125, in other implementations, B2BUA device 125 may include fewer functional components, different functional components, differently arranged functional components, or additional functional components than depicted in FIG. 3. Additionally or alternatively, one or more functional components of B2BUA device 125 may perform functions described as being performed by one or more other functional components of B2BUA device 125.

Figure 4:
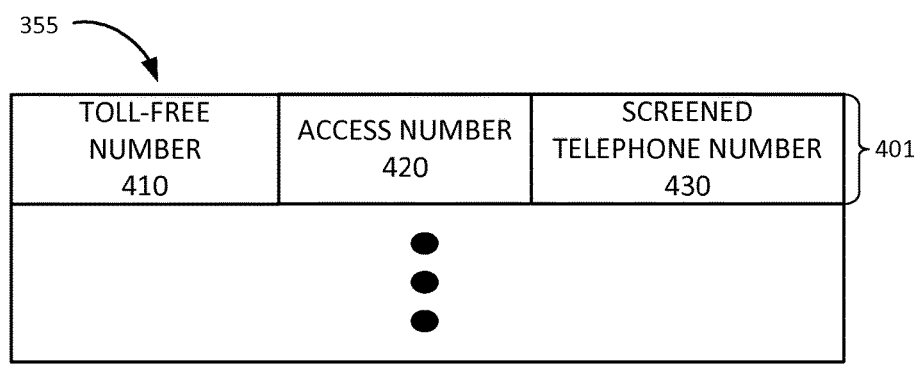
FIG. 4 is a diagram of exemplary information that may be stored in a local exchange carrier database according to an implementation described herein.

FIG. 4 is a diagram of exemplary information that may be stored in number DB 355 according to an implementation described herein. As shown in FIG. 4, number DB 355 may include one or more number entries 401. Each call number entry 401 may store information associated with a particular toll-free number. Number entry 401 may include a toll-free number field 410, an access number field 420, and a screened telephone number field 430.

Toll-free number field 410 may store a particular toll-free number associated with a network serviced by call control logic 330 of B2BUA device 125. For example, toll-free number field 410 may store a toll-free number associated with call center 135 (e.g., a toll-free number a customer may dial to reach call center 135). Access number field 420 may store an access number associated with the particular toll-free number. For example, access number field 420 may store a non-toll-free number associated with call center 135 that a customer may dial to reach call center 135. The access number may be known to networks outside of provider SIP network 120. In other words, the access number may be reached via the PSTN. Screened telephone number field 430 may store a screened telephone number associated with the particular toll-free number. For example, the screened telephone number may be a number assigned to call center 135 by provider SIP network 120 and may be unknown outside of provider SIP network 120. The screened telephone number may be used to route calls through provider SIP network 120.

Although FIG. 4 shows exemplary components of number DB 355, in other implementations, number DB 355 may include fewer components, different components, differently arranged components, or additional components than depicted in FIG. 4.

Figure 5:
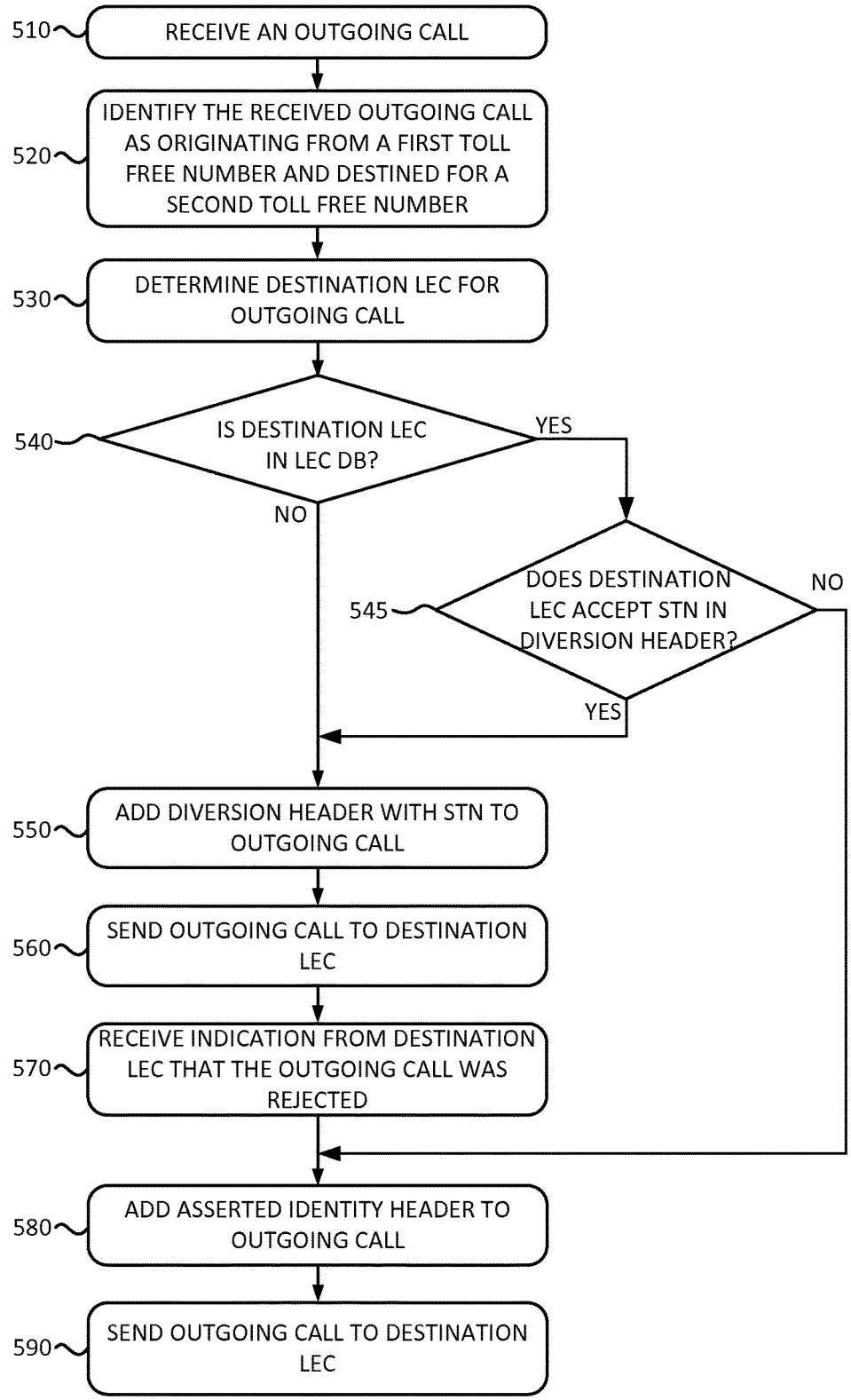
FIG. 5 is a flow chart of an exemplary process for delivering a toll-free caller identifier according to an implementation described herein.

FIG. 5 is a flow chart of an exemplary process for delivering a toll-free caller identifier according to an implementation described herein. In one implementation, the process of FIG. 5 may be performed by one or more of the B2BUA devices 125 illustrated in FIG. 1. In other implementations, some or all of the process of FIG. 5 may be performed by another device or a group of devices separate from B2BUA device 125 and/or including B2BUA device 125.

The process of FIG. 5 may include receiving an outgoing call (block 510) and identifying the outgoing call as originating from a first toll-free number and destined for a second toll-free number (block 520). For example, B2BUA device 125-C may receive a SIP INVITE message from call center 135 destined for service device 145 and the SIP INVITE message may include a FROM header that includes the first toll-free number associated with call center 135 and a TO header that includes the second toll-free number associated with service device 145. Toll-free call manager 340 may identify SIP INVITE message as corresponding to a call as originating from a first toll-free number and destined for a second toll-free number. As another example, B2BUA device 125-B or B2BUA device 125-D may be configured to include toll-free manager 340 and the call may be identified as originating from a first toll-free number and destined for a second toll-free number after the call has been transferred by B2BUA device 125-C to provider SIP network 120.

A destination LEC may be determined for the outgoing call (block 530) and a determination may be made as to whether the destination LEC is in the LEC DB (block 540). For example, call control logic 330 may access a call routing table to identify a destination LEC associated with the second toll-free number. Furthermore, toll-free call manager 340 of call control logic 330 may access LEC DB 350 to determine whether an entry exists for the determined destination LEC.

If it is determined that no entry exists for the destination LEC in the LEC DB (block 540—NO), a diversion header with a screened telephone number (STN) may be added to the outgoing call (block 550) and the outgoing call may be sent to the destination LEC (block 560). For example, diversion header logic 360 may add a diversion header to the SIP INVITE message, may access number DB 355 to determine a screened telephone number associated with the first toll-free number, and may add the screened telephone number to the diversion header. Network-side user agent 320 may then forward the SIP INVITE message toward the destination LEC (e.g., LEC network 140).

If it is determined that an entry exists for the destination LEC in the LEC DB (block 540—YES), a determination may be made as to whether the destination LEC accepts a screen telephone number in a diversion header (block 545). If it is determined that the destination LEC accepts a screen telephone number in a diversion header (block 545—YES), processing may continue to block 550 to add the diversion header with the screened telephone number. If it is determined that the destination LEC does not accept a screen telephone number in a diversion header (block 545—NO), processing may continue to block 580 to add an asserted identity header to the outgoing call. In some implementations, before the asserted identity header is added, a diversion header with the screened telephone number may also be added before continuing to block 580 (not shown in FIG. 5).

In some situations, the outgoing call with the diversion header may be accepted by LEC network 140. For example, B2BUA 125-E, a call routing device, and/or another device in LEC network 140 that routes the call to service device 145 may ignore the fact that the FROM header includes a toll-free number and may accept the screened telephone number in the diversion header as a valid telephone number identifying the calling party.

In other situations, the call may be rejected by LEC network 140. For example, B2BUA 125-E, a call routing device, and/or another device in LEC network 140 that routes the call to service device 145 may reject the call and may send a rejection message back to the B2BUA device that added the diversion header. Alternatively, the SIP INVITE message may time out without the B2BUA device receiving an acknowledgement message (e.g., a SIP ACK message).

Thus, an indication may be received from the destination LEC that the outgoing call was rejected (block 570) and, in response, an asserted identity header may be added to the call (block 580) and the call may be re-sent to the destination LEC (block 590). For example, asserted identity header logic 370 may add a P-AI header to the SIP INVITE message, may access number DB 355 to determine an access number associated with the first toll-free number, and may add the access number to the P-AI header. Asserted identity header logic 370 may further add the first toll-free number (e.g., in quotes) as a display number to the P-AI header. Some LEC networks may be configured to display the display number to the customer as the number being called and thus the customer may still see the first toll-free number as the number being called after the telephone call is transferred to the second toll-free number. Network-side user agent 320 may then forward the SIP INVITE message toward the destination LEC (e.g., LEC network 140) with the included P-AI header.

FIG. 6 is a diagram of an exemplary SIP INVITE message 600 according to an exemplary implementation described herein. As shown in FIG. 6, SIP INVITE message 600 may include a FROM header 610, a TO header 620, a diversion header 630, and a P-AI header 640. FROM header 610 may include the phone number originating the SIP INVITE message and may include a first toll-free number (i.e., 8666666666 in this example). TO header 620 may include a phone number for which the SIP invite message is destined and may include a second toll-free number (i.e., 8555555555 in this example). Diversion header 630 may include a screened telephone number associated with the first toll-free number (i.e., 9722222222 in this example). P-AI header 640 may include an access number associated with the first toll-free number (i.e., 9723333333 in this example). Furthermore, P-AI header 640 may include a display number, which may correspond to the first toll-free number.

FIG. 7 is a first exemplary signal flow 700 for delivering a toll-free caller identifier according to an implementation described herein. In signal flow 700, the toll-free call processing is performed by B2BUA device 125-C in private network 130. Signal flow 700 may begin with user device 110 sending a SIP INVITE message to call center 135 via provider SIP network 120. For example, assume a customer decides to contact call center 135 with user device 110 with a technical problem for a product sold by a company associated with call center 135 and calls a first toll-free number associated with call center 135.

User device 110 may send the SIP INVITE message to B2BUA device 125-B (signal 710), B2BUA device 125-B may send a SIP INVITE message to B2BUA device 125-C (signal 715), and B2BUA device 125-C may send a SIP INVITE message to call center 135 (signal 720). Call center 135 may accept the call with an acknowledgement in the form of a SIP ACK message. Call center 135 may send a SIP ACK message to B2BUA device 125-C (signal 725), B2BUA device 125-C may send a SIP ACK message to B2BUA device 125-B (signal 730), and B2BUA device 125-B may send a SIP ACK message to user device 110 (signal 735). At this point, the customer may be connected to call center 135 and may start talking to a call center agent about the customer's reason for calling.

The call center agent may determine that the customer is calling about a technical problem and that call center agents dealing with technical problems are available via service device 145, associated with a second toll-free number. The call center agent may select to transfer the call (block 740) (e.g., to call service device 145) and start a process to transfer the customer to a technical help agent and call center 135 may send a SIP INVITE message to B2BUA device 125-C, with a FROM header that includes the first toll-free number and a TO header that includes the second toll-free number (signal 750).

B2BUA device 125-C may determine that the call associated with the received SIP INVITE is from a first toll-free number to a second toll-free number and may add a diversion header that includes a screened telephone number (STN), associated with the first toll-free number, to the SIP INVITE message (block 745). B2BUA device 125-C may then send the SIP INVITE message with the diversion header to B2BUA device 125-B (signal 750) and B2BUA device 125-B may send the SIP INVITE message to B2BUA device 125-E in LEC network 140 (signal 755). B2BUA device 125-E may accept the SIP INVITE message (block 760) and may, in response, send the SIP INVITE message to the destination identified in the TO field, namely service device 145 (signal 765).

Service device 145 may respond with a SIP ACK message to B2BUA device 125-E (signal 770), which may be sent to call center 135 via B2BUA device 125-B in provider SIP network 120 and B2BUA device 125-C in private network 130 (signals 775, 780, and 785). Service device 145 may now be connected to call center 135 and the call center agent at call center 135 may speak with a technical help agent associated with service device 145 to transfer the customer's call to the technical help agent.

Figure 8:
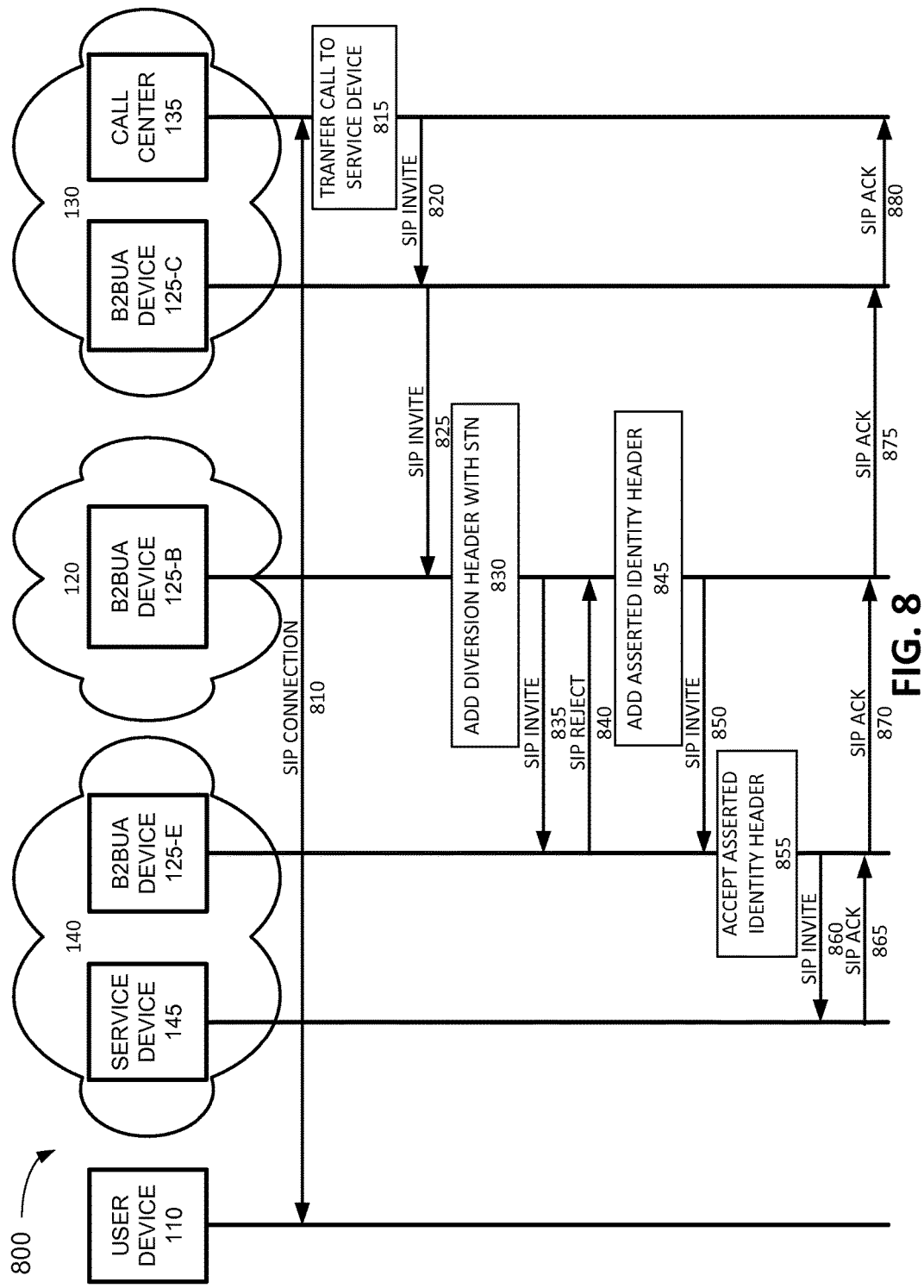
FIG. 8 is a second exemplary signal flow for delivering a toll-free caller identifier according to an implementation described herein.

FIG. 8 is a second exemplary signal flow 800 for delivering a toll-free caller identifier according to an implementation described herein. In signal flow 800, the toll-free call processing is performed by B2BUA device 125-B in provider SIP network 120. Thus, in this implementation, private network 140 need not worry about configuring any devices to handle toll-free to toll-free calls. Signal flow 800 may begin with user device 110 establishing a SIP connection with call center 135 (signal 810), similarly to as described above with respect to signal flows 710, 715, 720, 725, 730, and 735 of FIG. 7.

A call center agent may select to transfer the call to service device 145 (block 815) and call center 135 may send a SIP INVITE message to B2BUA device 125-C, with a FROM header that includes the first toll-free number and a TO header that includes the second toll-free number (signal 820). B2BUA device 125-C may forward the SIP INVITE message to B2BUA device 125-B in provider SIP network 120 (signal 825). B2BUA device 125-B may determine that the call associated with the received SIP INVITE is from a first toll-free number to a second toll-free number and may add a diversion header that includes a screened telephone number (STN), associated with the first toll-free number, to the SIP INVITE message (block 830). B2BUA device 125-B may then send the SIP INVITE message with the diversion header to B2BUA device 125-E in LEC network 140 (signal 835).

B2BUA device 125-E may detect the call as a call to a toll-free number and may enter special programming for toll-free numbers, which may look for a valid DID number and may determine that the screened telephone number is not a valid DID number. In response, B2BUA device 125-E may reject the call and may send a SIP REJECT message back to B2BUA device 125-B (signal 840). Alternatively, B2BUA device 125-E may not respond with a SIP ACK signal and after a timeout in which no acknowledgement was received, B2BUA device 125-B may determine that the call was rejected.

In response, B2BUA device 125-B may determine that an asserted identify header is required, may add a P-AI header to the SIP INVITE message with an access number associated with the first toll-free number (block 845), and may re-send the SIP INVITE message with the P-AI header to B2BUA device 125-E (block 850). B2BUA device 125-E may accept the SIP INVITE message and may, in response, send the SIP INVITE message to the destination identified in the TO field, namely service device 145 (signal 860).

Service device 145 may respond with a SIP ACK message to B2BUA device 125-E (signal 865), which may be sent to call center 135 via B2BUA device 125-B in provider SIP network 120 and B2BUA device 125-C in private network 130 (signals 870, 875, and 880). Service device 145 may now be connected to call center 135 and the call center agent at call center 135 may speak with another agent at service device 145 or may interact with an IVR system at service device 145 on behalf of the customer.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

As an example, while series of blocks have been described with respect to FIG. 5, the order of the blocks may be modified in other implementations. Further, non-dependent blocks may be performed in parallel. As another example, while series of signal flows have been described with respect to FIGS. 7 and 8, the order of the signal flows may be modified in other implementations. Further, non-dependent signal flows may be performed in parallel.

As another example, although examples were described with respect to call center to call center forwarding, implementations described herein may be applies to any toll-free to toll-free scenario, or any scenario in which a call is forwarded without a valid DID number, such as if a FROM header in a SIP INVITE message includes an "unknown" entry.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It should be emphasized that the terms "comprises"/ "comprising" when used in this specification are taken to specify the presence of stated features, integers, steps or components but does not preclude the presence or addition of one or more other features, integers, steps, components or groups thereof.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method performed by a computer device, the method comprising:
   receiving, by the computer device, a Session Initiation Protocol (SIP) telephone call;
   identifying, by the computer device, the SIP telephone call as originating from a first toll-free telephone number and destined for a second toll-free telephone number;
   determining, by the computer device, a screened telephone number associated with the first toll-free telephone number, wherein the screened telephone number is assigned to the first toll-free telephone number by a provider network that carries SIP telephone calls between a SIP network associated with the first toll-free telephone number and a local exchange carrier network associated with the second toll-free telephone number;
   generating, by the computer device, a diversion header that includes the determined screened telephone number for the SIP telephone call, in response to identifying the SIP telephone call as originating from the first toll-free telephone number and destined for the second toll-free telephone number; and
   sending, by the computer device, the SIP telephone call to the local exchange carrier network associated with the second toll-free telephone number.

2. The method of claim 1, further comprising:
   receiving an indication from the local exchange carrier network that the SIP telephone call was rejected by the local exchange carrier network;
   generating an asserted identity header that includes an access number associated with the first toll-free telephone number, in response to receiving the indication that the SIP telephone call was rejected by the local exchange carrier network; and re-sending the SIP telephone call to the local exchange carrier network with the generated asserted identity header.

3. The method of claim 2, wherein the asserted identity header further includes the first toll-free telephone number as a display number.

4. The method of claim 1, wherein the computer device functions as a back-to-back user agent for a SIP network associated with the first toll-free telephone number.

5. The method of claim 4, wherein the computer device includes at least one of:
an Internet Protocol Private Branch Exchange device;
a Session Border Controller device; or
a Session Initiation Protocol Application Server device.

6. The method of claim 1, wherein the computer device functions as a back-to-back user agent for the provider network that carries SIP telephone calls between a SIP network associated with the first toll-free telephone number and the local exchange carrier network associated with the second toll-free telephone number.

7. The method of claim 1, wherein the SIP telephone call is received from a call center, and wherein the SIP telephone call is associated with another SIP telephone call between the call center and a user device associated with a customer of the call center.

8. The method of claim 1, further comprising:
determining that the local exchange carrier network associated with the second toll-free telephone number requires an asserted identity header for telephone calls from the first toll-free telephone number to the second toll-free telephone number, based on information stored in the local exchange carrier network; and
generating an asserted identity header for the SIP telephone call that includes an access number associated with the first toll-free telephone number, in response determining that the local exchange carrier network associated with the second toll-free telephone number requires an asserted identity header for telephone calls from the first toll-free telephone number to the second toll-free telephone number.

9. A computer device comprising:
logic configured to:
receive a Session Initiation Protocol (SIP) telephone call;
identify the SIP telephone call as originating from a first toll-free telephone number and destined for a second toll-free telephone number;
determine a screened telephone number associated with the first toll-free telephone number, wherein the screened telephone number is assigned to the first toll-free telephone number by a provider network that carries SIP telephone calls between a SIP network associated with the first toll-free telephone number and a local exchange carrier network associated with the second toll-free telephone number;
generate a diversion header that includes the determined screened telephone number for the SIP telephone call, in response to identifying the SIP telephone call as originating from the first toll-free telephone number and destined for the second toll-free telephone number; and
send the SIP telephone call to the local exchange carrier network associated with the second toll-free telephone number.

10. The computer device of claim 9, wherein the logic is further configured to:

receive an indication from the local exchange carrier network that the SIP telephone call was rejected by the local exchange carrier network;
generate an asserted identity header that includes an access number associated with the first toll-free telephone number, in response to receiving the indication that the SIP telephone call was rejected by the local exchange carrier network; and
re-send the SIP telephone call to the local exchange carrier network with the generated asserted identity header.

11. The computer device of claim 9, wherein the computer device functions as a back-to-back user agent for a SIP network associated with the first toll-free telephone number.

12. The computer device of claim 11, wherein the computer device includes at least one of:
an Internet Protocol Private Branch Exchange device;
a Session Border Controller device; or
a Session Initiation Protocol Application Server device.

13. The computer device of claim 9, wherein the computer device functions as a back-to-back user agent for the provider network that carries SIP telephone calls between a SIP network associated with the first toll-free telephone number and the local exchange carrier network associated with the second toll-free telephone number.

14. The computer device of claim 9, wherein the SIP telephone call is received from a call center, and wherein the SIP telephone call is associated with another SIP telephone call between the call center and a user device associated with a customer of the call center.

15. The computer device of claim 9, wherein the logic is further configured to:
determine that the local exchange carrier network associated with the second toll-free telephone number requires an asserted identity header for telephone calls from the first toll-free telephone number to the second toll-free telephone number, based on information stored in the local exchange carrier network; and
generate an asserted identity header for the SIP telephone call that includes an access number associated with the first toll-free telephone number, in response determining that the local exchange carrier network associated with the second toll-free telephone number requires an asserted identity header for telephone calls from the first toll-free telephone number to the second toll-free telephone number.

16. A non-transitory computer-readable medium, storing instructions executable by one or more processors, the non-transitory computer-readable medium comprising:
one or more instructions to receive a Session Initiation Protocol (SIP) telephone call;
one or more instructions to identify the SIP telephone call as originating from a first toll-free telephone number and destined for a second toll-free telephone number;
one or more instructions to determine a screened telephone number associated with the first toll-free telephone number;
one or more instructions to generate a diversion header that includes the determined screened telephone number for the SIP telephone call, in response to identifying the SIP telephone call as originating from the first toll-free telephone number and destined for the second toll-free telephone number;
one or more instructions to determine that a local exchange carrier network associated with the second toll-free telephone number requires an asserted identity header for telephone calls from the first toll-free telephone number to the second toll-free telephone number, based on information stored in the local exchange carrier network;

one or more instructions to generate an asserted identity header for the SIP telephone call that includes an access number associated with the first toll-free telephone number, in response determining that the local exchange carrier network associated with the second toll-free telephone number requires an asserted identity header for telephone calls from the first toll-free telephone number to the second toll-free telephone number; and one or more instructions to send the SIP telephone call to the local exchange carrier network associated with the second toll-free telephone number.

17. The non-transitory computer-readable medium of claim 16, wherein the screened telephone number is assigned to the first toll-free telephone number by a provider network that carries SIP telephone calls between a SIP network associated with the first toll-free telephone number and the local exchange carrier network associated with the second toll-free telephone number.

18. The non-transitory computer-readable medium of claim 16, wherein the asserted identity header further includes the first toll-free telephone number as a display number.

* * * * *